Dec. 18, 1934.  F. R. HIGLEY  1,984,831
VEHICLE DRIVE
Filed May 5, 1933
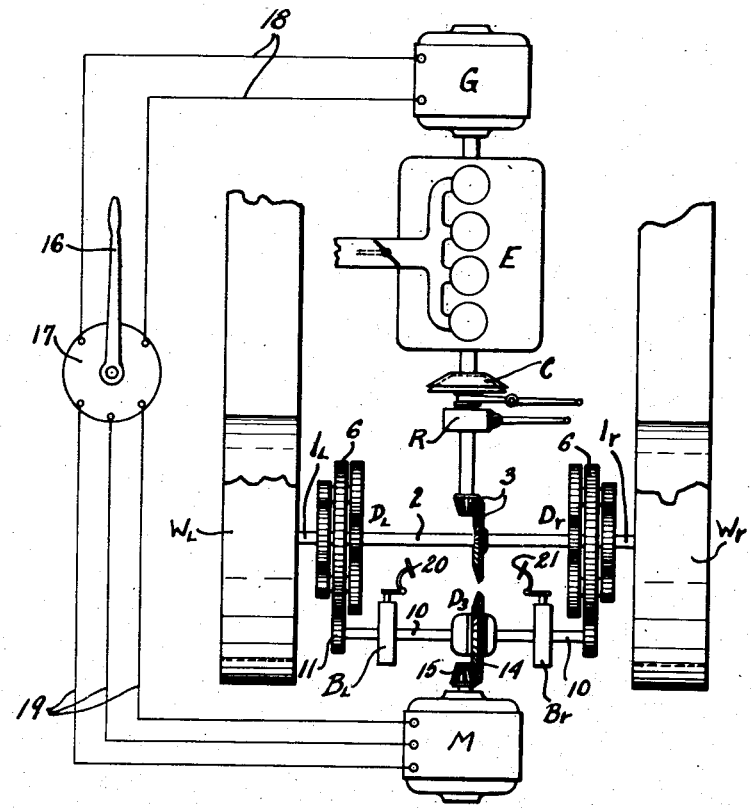
Fig. 1
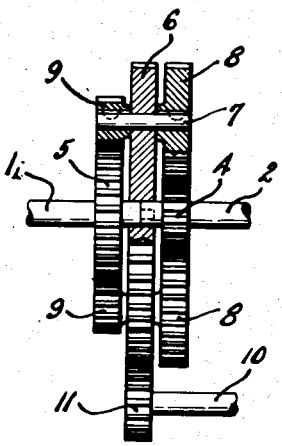
Fig. 2
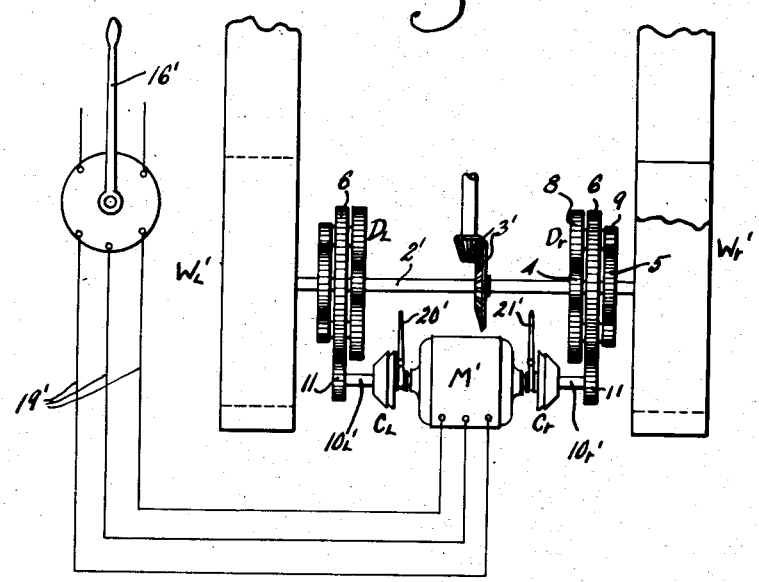
Fig. 4
Fig. 3
INVENTOR
FRANK R. HIGLEY
BY
Brockett, Hyde, Higley & Meyer
ATTORNEYS Patented Dec. 18, 1934

1,984,831

UNITED STATES PATENT OFFICE 1,984,831

VEHICLE DRIVE

Frank R. Higley, Cleveland Heights, Ohio

Application May 5, 1933, Serial No. 669,496

12 Claims. (Cl. 180—17)

This invention relates to self-propelled vehicles, and more particularly relates to electro-mechanical drives therefor wherein part of the drive connection from the prime mover to the traction means is mechanically transmitted, and the remaining part transmitted by means including an electric system; the arrangement being one wherein the effective gear ratio between engine and traction means is substantially infinitely variable without interruption to torque. The invention particularly has to do with vehicles arranged for steering by driving, that is, vehicles adapted to be steered by varying the relative speed of the traction means on either side.

The objects of the invention are to provide such a vehicle which shall have improved operating characteristics both as to efficiency of the driving transmission, as to maneuverability of the vehicle, and as to convenience for the operator.

The exact nature of this invention together with further objects and advantages thereof will be apparent from the following description taken in connection with the accompanying drawing, in which Fig. 1 is a diagrammatic and conventionalized view illustrating the functional relation of the principal propelling parts of an embodiment of the invention, the view being in the nature of a layout plan view with parts appearing conventionally; Fig. 2 is an enlarged detail of the driving differential employed in the auxiliary axle appearing in Fig. 1; Fig. 3 is an enlarged detail of one of the pair of wheel driving differentials appearing in Fig. 1; and Fig. 4 illustrates, similarly as in Fig. 1, a modified construction, corresponding parts in the two views having similar reference characters applied thereto.

With reference now to the drawing and particularly to the embodiment of Figs. 1 to 3 thereof, E is the engine of the vehicle, which may be of the internal combustion type indicated. $W_l$ and $W_r$ indicate respectively left and right hand traction means of the vehicle. These may be simply round wheels, or they may be of the well-known crawler type, including endless tread linkages as indicated. It will be understood that these parts together with those hereinafter described, are interassociated by the usual frame etc., and moving parts are mounted in the usual bearings, which are omitted from the drawing to simplify the latter.

The wheel means $W_l$ and $W_r$ are mounted on aligned stub axles $l_l$ and $l_r$ by which they are driven as will appear. A driving axle shaft 2 extends between these stub shafts. The shaft 2 has drive from the engine E by way of a clutch C, reversing gear box R and gears 3 as indicated. Each end of the shaft 2 has connection with its stub axle 1 through one of the differentials $D_l$ or $D_r$. These differentials are alike, each having an input element or pinion 4 secured with the shaft 2 and an output element or gear 5 secured with its stub shaft 1. Each differential includes an intermediate member 6 in which is mounted for free rotation one or more spindles 7 (two being indicated), upon one end of which is secured a gear 8 meshing with the pinion 4 and on the other end of which is secured a pinion 9 meshing with the gear 5. The intermediate members 6 of the two differentials act as second input elements thereof, and are arranged to be driven by an auxiliary axle shaft 10, the arrangement here illustrated for the purpose including pinions 11 on the shaft 10 meshing with peripheral gear teeth on the members 6.

The differentials $D_l$ and $D_r$ will be recognized as of the well-known epicyclic type. The exact type, however, is not particularly material, the requirements of the arrangement being that each differential have a pair of input elements in differential relation, one having drive from the engine and the other from the shaft 10; and each differential has an output element in driving relation with its traction means, as will be appreciated.

The shaft 10 as indicated in Fig. 2, is actually in two parts, there designated at $10_l$ and $10_r$, joined by a driving differential including, as here shown, driving gears 12, one for each side of the shaft, and driving pinions 13 meshing therewith, the driving pinions being mounted upon a ring gear 14. The arrangement will be recognized as identical in principle with the usual automotive driving axle wherein drive of the ring gear effects drive of each side of the axle shaft in differential relation, so that the two axle halves may rotate at different speeds provided the sum of their speeds equals the speed of the ring gear. The differential of the auxiliary axle is indicated in Fig. 1 by the reference character $D_3$.

A generator G is arranged to be driven by the engine E, and is arranged to drive a motor M which in turn drives the ring gear 14 as through a pinion 15. The motor M is a reversing motor and its drive by the generator G is arranged for control by the operator, by the handle 16 of the controller 17; this electrical system including the usual connections indicated in the drawing and particularly those indicated at 18 leading from the generator to the controller and connections leading from the controller to the motor.

The left-hand half of the auxiliary axle shaft 10 is provided with a brake $B_l$ and the right-hand half by a brake $B_r$. These brakes are arranged for selective application by the operator as by the pedals indicated at 20 and 21 respectively, or in any other convenient manner.

Operation will be as follows, assuming the engine E running, and driving the generator preferably under governor control at constant speed, the clutch C disengaged, the reverse gear R and the motor controller in neutral position.

To cause the vehicle to move ahead the operator shifts the reverse gear R into forward position and engages the clutch C. This puts the axle shaft 2 into operation. The wheel means do not immediately revolve, however. Instead, the two driving differentials $D_l$ and $D_r$ set the shaft 10 into motion in reverse direction, with respect to the usual condition under high speed ahead operation of the tractor, causing the motor M to be idled backwards. The operator next advances the controller lever 16 forwardly, connecting the motor M with the generator G. The motor M delivers torque in the ahead direction, and slows down the shaft 10; and as the controller is advanced to full speed ahead position, the motor ultimately acts on the shaft 10 to bring it up to full speed in the ahead direction. The shaft 10 thus, having commenced at maximum reverse speed, slows down to zero speed and then accelerates up to full forward speed, the motor continuing meanwhile to deliver torque always in the forward direction.

The proportioning and arrangement of the electrical parts with reference to the mechanical parts is such that something less than half of the power is delivered through the electrical system and the remainder mechanically. The proportioning and arrangement of the differentials $D_l$ and $D_r$ is preferably such that when both motor and engine are driving at full speed ahead, the differential gears have slight if any rotation relative to each other.

Should the operator desire to cause the vehicle to deviate from the straight path, he applies the brake on that side to which he wishes the vehicle to swerve. So long as one brake or the other is applied the vehicle will move on a radius on that side, the mean vehicle speed remaining substantially constant, however, since as the speed of one side is decreased so is the speed of the other side increased through the action of the differential $D_3$.

Stopping of the vehicle is accomplished by performing the described starting operations, but in the reverse order.

Reverse operation will obviously be generally as before except that the reverse gear R is thrown from neutral into reverse instead of forward, and similarly the controller member 16 moved rearwardly instead of forwardly.

It will be observed that the motor M is available as a brake by proper reverse manipulation of its controller.

It will also be observed that the vehicle may be operated with a wholly mechanical drive without the use of the motor, as should there be a failure in the electrical system, or, for convenience, in short periods at low speeds, or where maximum drawbar pull is desired as in starting. This is accomplished once the clutch C and reverse gear R are properly engaged, the motor controller 16 being in neutral position, simply by depressing both brake pedals 20 and 21 to apply both brakes $B_l$ and $B_r$. Under travel by these movements, steering is had simply by releasing the brake on that side toward which it is desired to turn. And obviously, both brakes being released, engagement of either will set the wheel means on that side of the vehicle into motion to cause the vehicle to turn about the wheel means on its opposite side. Of course, such operation might be in either direction, dependent upon the setting of the reverse gear R.

With reference now to the modification of Fig. 4 wherein the parts and their arrangement are as before except as hereinafter noted, the motor M' is arranged to positively drive both sides $10_l'$ and $10_r'$ of the auxiliary axle shaft, subject to the clutches $C_l$ and $C_r$ arranged to be normally engaged, and disengageable by their levers 20' and 21'.

Operation of the arrangement of Fig. 4 will similarly be as before except where here noted. Once the shaft 2' is caused to operate in the ahead direction by suitable adjustment of the clutch C and reverse gear R, the vehicle is set in motion by actuation of the motor M' in the ahead direction, accomplished by adjustment of its controller 16'. The motor M' first slows down from maximum reverse idling operation, then accelerates in forward direction, the traction means meanwhile accelerating from zero to full speed, all as before. Once the vehicle is thus travelling, to steer, the operator releases one of the clutches $C_l$, or $C_r$ depending on the direction in which he wishes to turn. If, for example, he wishes to turn to the right he releases the right-hand clutch $C_r$. This disconnects the drive to the right-hand traction means $W_r'$, the left-hand traction means, however, continuing in motion, at the slightly increased speed caused by the entire output of the motor M' and engine E now being delivered to it. Instantly the steering clutch is permitted to re-engage by release of its control lever, the vehicle will resume straight ahead travel, but in the new direction.

It will be observed that in both the arrangements described, the load of the steering control is not the full driving load of either of the traction means. In the arrangement of Fig. 1 the capacity of the brakes $B_l$ and $B_r$ need only be that to stop one side of the motor driven shaft. Thus the operator's effort required for the steering by braking is much less than were the brake arranged for example directly upon one of the traction means stub shafts. Similarly in the arrangement of Fig. 4 the capacity of each of the steering clutches need only be that of the motor M', much less than that to actually drive one of the traction means.

What I claim is:

1. In a vehicle having an engine and a pair of traction means, one on each side, a generator driven by the engine, a motor arranged to have drive by said generator, for each traction means a driving differential mechanism having a pair of input elements one connected with said engine, and means providing for drive of the second input elements of each of said differential mechanisms by said motor for coincident similar effect upon both said traction means.

2. In a vehicle having an engine and a pair of traction means, one on each side, a generator driven by the engine, a motor arranged to have drive by said generator, for each traction means a driving differential mechanism having a pair of input elements one connected with said engine, and means providing driving connections from said motor to the second input elements of each of said differential mechanisms, for coincident similar effect upon both said traction means.

3. In a vehicle having an engine and a pair of traction means, one on each side, a generator driven by the engine, a motor arranged to have drive by said generator, for each traction means a driving differential mechanism having a pair of input elements one connected with said engine, driving connection from said motor to the second input elements of said differential mechanisms, and means for controlling said driving connections to interrupt the driving effect of either independent of the other.

4. In a vehicle having an engine and a pair of traction means, one on each side, a generator driven by the engine, a motor arranged to have drive by said generator, for each traction means a driving differential mechanism having a pair of input elements one connected with said engine, and driving connections from said motor to the second input elements of said differential mechanisms, each of said driving connections including a clutch adapted to interrupt its drive.

5. In a vehicle having an engine and a pair of traction means one on each side, for each traction means a driving differential mechanism having a pair of input elements one connected with said engine, differential means connecting the second input elements of said differential mechanisms, for their coincident drive in differential relation, means for independently braking each of said second input elements and means for driving said differential means.

6. In a vehicle having an engine and a pair of traction means one on each side, a generator driven by the engine, a motor arranged to have drive by said generator, for each traction means a driving differential mechanism having a pair of input elements one connected with said engine, means providing for drive of the second input elements in said differential mechanisms by said motor and including a third differential mechanism, said third differential mechanism having an input element driven by said motor and a pair of output elements each in driving relation with one of the second input elements of said driving differential mechanisms.

7. In a vehicle having an engine and a pair of traction means one on each side, a generator driven by the engine, a motor arranged to have drive by said generator, for each traction means a driving differential mechanism having a pair of input elements one connected with said engine, means providing for drive of the second input elements in said differential mechanisms by said motor and including a third differential mechanism, said third differential mechanism having an input element driven by said motor and a pair of output elements each in driving relation with one of the second input elements of said driving differential mechanisms, and means for independently braking each of said second input elements whereby the vehicle may be steered.

8. In a vehicle having an engine and a pair of traction means, one on each side, a generator driven by the engine, a motor arranged to have drive by said generator, for each traction means a driving differential mechanism having a pair of input elements one connected with said engine, and means providing for simultaneous drive in the same direction, of the second input elements of said differential mechanisms, by said motor.

9. In a vehicle having an engine and a pair of traction means, one on each side, a generator driven by the engine, a motor arranged to have drive by said generator, for each traction means a driving differential mechanism having a pair of input elements one connected with said engine, and means providing separately releasable driving connections from said motor to the second input elements of said differential mechanisms.

10. In a vehicle having an engine and a pair of traction means, one on each side, a generator driven by the engine, a motor arranged to have drive by said generator, for each traction means a driving differential mechanism having a pair of input elements one connected with said engine, and means providing separately controlled driving connections from said motor to the second input elements of said differential mechanisms.

11. In a vehicle having an engine and a pair of traction means, one on each side, a generator driven by the engine, a motor arranged to have drive by said generator, for each traction means a driving differential mechanism having a pair of input elements one connected with said engine, differentially related driving connections from said motor to the second input elements of said differential mechanisms, and means for controlling said driving connections to coincidently decrease the driving effect of one and increase that of the other.

12. In a vehicle having an engine and a pair of traction means, one on each side, a generator driven by the engine, a motor arranged to have drive by said generator, a controller for said motor drive, for each traction means a driving differential mechanism having a pair of input elements, one element of each pair having driven connection with said engine, clutch means for controlling said connection, driving connection from said motor to the second input elements of said differential mechanisms, and means for controlling said driving connections to interrupt the driving effect of either independent of the other.

FRANK R. HIGLEY.